(12) United States Patent
Shiotani

(10) Patent No.: US 7,507,448 B2
(45) Date of Patent: Mar. 24, 2009

(54) PROCESS FOR OPTICAL ALIGNMENT

(75) Inventor: Sayu Shiotani, Yokohama (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 232 days.

(21) Appl. No.: 11/226,226

(22) Filed: Sep. 15, 2005

(65) Prior Publication Data

US 2006/0057306 A1    Mar. 16, 2006

(30) Foreign Application Priority Data

Sep. 16, 2004    (JP)    ............................. 2004-269709

(51) Int. Cl.
*C09K 19/00* (2006.01)
*C09K 19/52* (2006.01)

(52) U.S. Cl. ........................... 428/1.1; 428/1.2; 430/20; 349/176

(58) Field of Classification Search .................. 428/1.1, 428/1.2; 430/20, 270.1; 349/176
See application file for complete search history.

(56) References Cited

U.S. PATENT DOCUMENTS

| 5,817,743 | A | 10/1998 | Gibbons et al. |
| 5,889,571 | A | 3/1999 | Kim et al. |
| 6,061,138 | A | 5/2000 | Gibbons et al. |
| 6,190,016 | B1 | 2/2001 | Suzuki et al. |
| 6,307,609 | B1 * | 10/2001 | Gibbons et al. ............. 349/124 |
| 6,407,789 | B1 | 6/2002 | Gibbons et al. |
| 6,532,047 | B1 * | 3/2003 | Suzuki et al. ................. 349/96 |
| 6,652,111 | B2 | 11/2003 | Suzuki et al. |
| 6,717,729 | B2 | 4/2004 | Goto et al. |
| 2003/0206337 | A1 | 11/2003 | Liang et al. |
| 2004/0207847 | A1 * | 10/2004 | Hardy ........................ 356/399 |

FOREIGN PATENT DOCUMENTS

EP    1 380 873 A2    1/2004

* cited by examiner

*Primary Examiner*—Geraldina Visconti
(74) *Attorney, Agent, or Firm*—David S. Safran; Roberts Mlotkowski Safran & Cole, P.C.

(57) ABSTRACT

A process for optical alignment in which an alignment layer is irradiated with polarized light from a light source and optical alignment is carried out, and in which polarized light is emitted within the light irradiation area of the light source with differently aligned polarization axes. In doing so, the alignment layer and the light irradiation area are moved relative to one another so that the divergence of the polarization axes of the polarized light is essentially cancelled relative to one another and the direction of optical alignment in the alignment layer is made uniform.

5 Claims, 5 Drawing Sheets

PROCESS FOR OPTICAL ALIGNMENT

BACKGROUND OF THE INVENTION

1. Field of Invention

The invention relates to a process for optical alignment in which alignment layers of a liquid crystal display (LCD) element and an angle of view field compensation film which is installed in a liquid crystal cell are irradiated with polarized light, and in which optical alignment is performed. The invention relates especially to a process for optical alignment in which the alignment layers can be aligned in the desired direction even when optical alignment is being performed with deviations of the polarization axis for the polarized light which is radiated onto the alignment layers.

2. Description of Related Art

A liquid crystal display element is produced as follows:

An alignment layer which is formed on the surface of a transparent substrate is subjected to treatment (alignment treatment) in which liquid crystals are aligned in the desired direction.

Two transparent substrates are placed on top of one another such that the alignment layers come to rest on the inside.

Liquid crystals are added between the alignment layers.

With respect to alignment treatment of the alignment layers of the above described liquid crystal display element, there is a technique which is called optical alignment in which the alignment layers are irradiated and exposed with polarized light with a given wavelength and in which this alignment is thus carried out. The device for irradiation with polarized light for optical alignment can be one of the devices which are described, for example, in Japanese patent specification JP 2928226 B and Japanese patent specification JP 2960392 B (both of which correspond to U.S. Pat. No. 6,190,016 B1).

Recently, the above described device for irradiation with polarized light has been used more and more often, not only to produce the above described liquid crystal display element, but also to produce an angle of view field compensation film, also called an optical compensation film or a wide-view film. The angle of view field compensation film was produced by application of liquid crystals for UV curing to a base film, alignment of the liquid crystal molecules in a certain direction, afterwards curing the liquid crystals by UV irradiation, and thus, fixing the direction of the liquid crystal molecules. By cementing an angle of view field compensation film to a liquid crystal display a reduction of the image quality is compensated. The film for producing optical alignment including the angle of view field compensation film is called an "optical alignment layer" below.

In the devices for irradiation with polarized light for optical alignment of the alignment layers of a liquid crystal display element which were described in the above described Japanese patents, as is also shown in FIG. 7 of JP 2928226 B and FIG. 5 in JP 2960392 B (FIG. 9 of corresponding U.S. Pat. No. 6,190,016 B1), a workpiece W which is a substrate, an angle of view field compensation film or the like, onto which an optical alignment layer has been applied, is irradiated with polarized exit light. For this purpose, UV-containing light which has been emitted from a light irradiation source is allowed to be incident in a polarization element in which, for example, several glass plates inclined at the Brewster angle, and is thus subjected to polarization separation. Then, the light is routed via an integrator lens, a plane mirror, a collimation lens, a collimation mirror or the like.

For optical alignment of an optical alignment layer, polarized light with a given wavelength (UV radiation, for example, with a wavelength of 280 nm to 320 nm) and with an extinction ratio at least equal to a given value (for example, with a ratio of the proportion of S-polarized light to P-polarized light of 1/10 to 1/100) is necessary. This is determined by the physical properties of the above described optical alignment layer. The term "extinction ratio" is defined as the ratio of the proportion of P-polarized light to the proportion of S-polarized light which are contained in the polarized light.

Recently, as the parameter for executing optical alignment, in addition to the above described wavelength and extinction ratio, also the divergence of the direction of the polarized light (hereinafter called the "polarization axis") within the irradiation surface has been considered more and more.

When using the device for irradiation with polarized light in the above described conventional example, the divergence within the surface of the polarization axis on the irradiation area is roughly ±0.5°, as is shown, for example, in FIG. 5. When deviations of the polarization axis occur in the polarized light with which the alignment layer is irradiated, divergence of the alignment direction of the alignment layer is caused; this can lead to faulty parts.

This means that, when optical alignment is being performed with light having large divergence within the surface of the polarization axis, the contrast of the liquid crystal display element as a finished part differs from place to place; this causes a reduction of image quality.

To eliminate divergence of the polarization axis approaches are suggested in Japanese Patent Publication JP2004347668 and Japanese Patent Publication JP2005128271. However, in the approaches of these publications, there is the disadvantage that there needs to be a special arrangement in the light irradiation means for eliminating the divergence of the polarization axis and that increases costs.

Furthermore, as a light source for irradiation with polarization light, also the use of a rod-shaped lamp has been suggested which is more easily used for irradiating a large area than a point light source lamp according to the above described conventional example. However, using a rod-shaped lamp makes it difficult to eliminate divergence of the polarization axis.

SUMMARY OF THE INVENTION

The invention has been devised to eliminate the above described disadvantages in the prior art. Thus, a primary object of the present invention is to devise a process for optical alignment in which alignment can be performed in the desired direction without divergence of the direction of alignment of the alignment light, even if the alignment layer is irradiated with polarized light with existing deviations of the polarization axis.

The above described object is achieved in accordance with the invention as follows:

In the area which is irradiated with the light from the light irradiation device, deviations of the polarization axis of the emitted polarized light are measured beforehand and the alignment layers are moved in the direction in which the deviations of the polarization axis are cancelled. Not only the alignment layers, but also the polarized light, can be moved.

The above described motion of the alignment layers or of the polarized light cancels the deviations of the polarized light, and the alignment layers are aligned in the direction of the middle of the deviations of the polarization axis.

Action of the Invention

In accordance with the invention, the alignment layers or the polarized light are moved in the direction in which the deviations of the polarization axis are cancelled. Therefore, the alignment layers can be aligned in the desired direction even if polarized light is emitted with existing deviations of the polarization axis.

The invention is further described below with reference to the accompanying drawings.

DETAILED DESCRIPTION OF THE INVENTION

With the invention, it was confirmed using the test described below that, by moving the alignment layers in the direction in which the deviations of the polarization axis are cancelled, alignment of the alignment layers in the desired direction is enabled.

Figure 1:
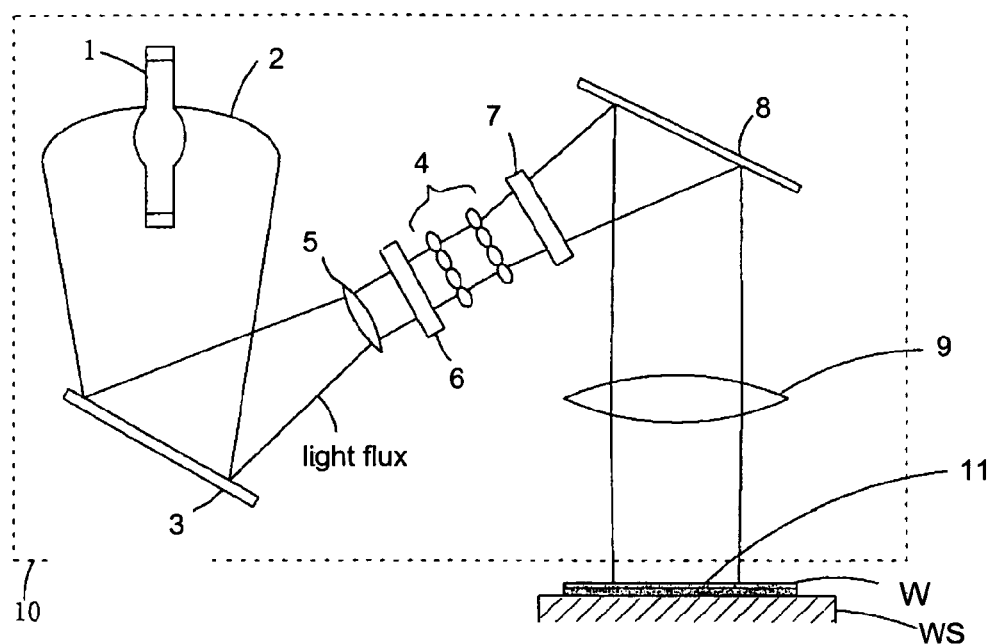
FIG. 1 is a schematic representation of an arrangement of a device for irradiation with polarized light for optical alignment which is used for purposes of a test in accordance with the invention.

FIG. 1 shows the arrangement of a device for irradiation with polarized light for optical alignment in accordance with the invention that was used in the test. A lamp 1 emitting UV-containing light was focused by means of a focusing mirror 2. The light was then reflected by a first plane mirror 3, made into parallel light by an input lens 5 and was incident in a polarization element 6. The polarization element 6 comprised several glass plates inclined with respect to the optical axis by the Brewster angle.

The light incident on the polarization element 6 was subjected to polarization separation. In the case of the above described polarization element 6, only P-polarized light emerged. The P-polarized light which emerged was incident in the integrator lenses 4 which are optical components for making the distribution of the illuminance on the light irradiation surface 11 uniform.

The P-polarized light which emerged from the integrator lenses 4 traveled via an open shutter 7, was reflected by a second planar mirror 8, and emitted onto a workpiece W placed on a work carrier WS. The work carrier WS is a substrate, an angle of view field compensation film or the like onto which the optical alignment layer has been applied.

If parallel light is necessary for the light which is to be emitted onto the workpiece W, between the second planar mirror 6 and the work carrier WS, either a collimation lens 9 or a collimation mirror is placed. FIG. 1 shows the case in which there is a collimation lens 9. The work carrier WS can be moved by means of a drive device (not shown) with the desired speed and within a surface which is parallel to the light irradiation surface.

Figure 5:
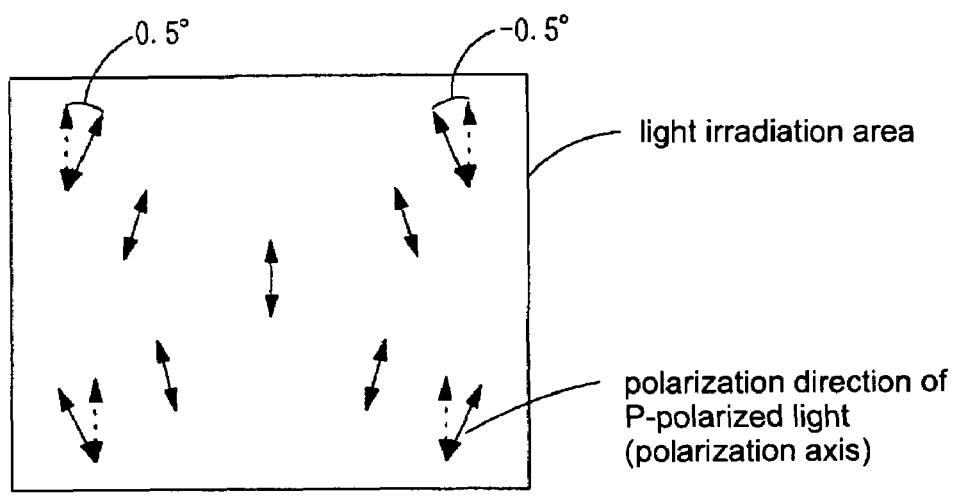
FIG. 5 is a schematic of one example the area of the polarization axis on the light irradiation surface of a conventional device for irradiation with polarized light.

In the device shown in FIG. 1, for irradiation with polarized light, a surface to be irradiated was irradiated with P-polarized light, and in doing so, the same deviations of the polarization surface as shown in FIG. 5 occurred.

Figure 2:
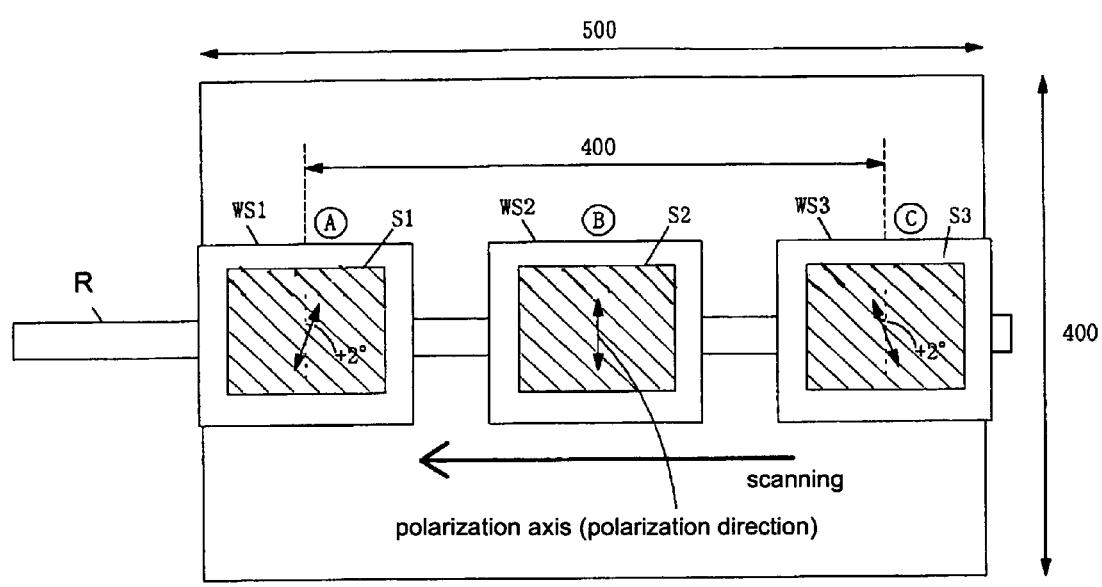
FIG. 2 is a schematic representation of the inclination of the polarization axis on the light irradiation surface of the device shown in FIG. 1 for irradiation with polarized light for optical alignment.

FIG. 2 shows the inclination of the polarization axis on the light irradiation surface for the device for irradiation with polarized light which is shown in FIG. 1. The area irradiated with polarized light is 500 mm×400 mm. The inclination of the polarization axis was measured at points A, B, and C in this irradiation area by means of a device for monitoring for the polarization axis.

If the direction of the polarization axis at the location of the middle area B of the irradiation area is taken as a reference, the polarization axis at point A (to the left in the drawings) of the irradiation area is inclined by roughly +2°, while the polarization axis at point C (to the right in the drawings) of the irradiation area is inclined by roughly −2°. The polarization axis therefore has deviations of roughly ±2° over the entire irradiation area.

Figure 3:
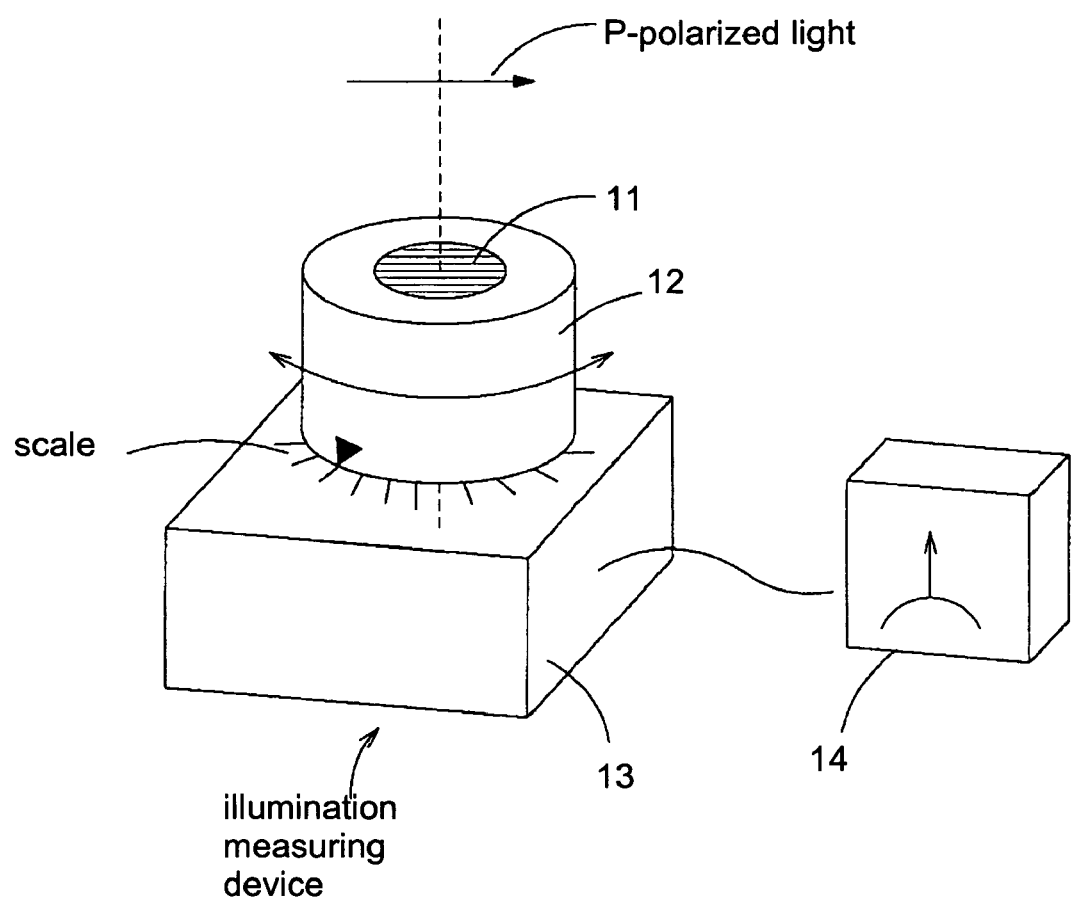
FIG. 3 is a schematic representation of one example of a device for monitoring the polarization axis which measures the dispersion angle of the polarization axis.

FIG. 3 shows an example of a device for monitoring the polarization axis which measures the deviation angle of the polarization axis. In the monitor for the polarization axis, basically a polarization plate is installed on the light incidence surface of an illumination measuring device. The cylinder 12 which is provided with a polarization plate 11 turns around the main body 13 which is provided with an illumination measuring device. The illuminance measured by the illumination measuring device is displayed on a monitor 14.

The above described device for monitoring the polarization axis is placed in the area irradiated with polarized light and the polarization plate 11 is turned by rotation of the cylinder 12. When the direction of the polarization plate 11 and the direction of the polarization axis of the polarized light agree with one another, a maximum illuminance is reached. Therefore, by reading off the angle from the scale the inclination of the polarization axis can be measured. Thus, deviations of the polarization axis can be measured by measuring the angle of the polarization axis without changing the direction of the main body of the illumination measuring device at several points of the light irradiation area.

Table 1 lists the deviations of the polarization axis at points A, B and C shown in FIG. 2. For the magnitude of the deviations of the polarization axis at points A and C, the direction of the polarization axis which was measured at point B and which is located essentially in the middle of the light irradiation area is taken as a reference and the angle of the deviation of the polarization axis from this reference is shown. Furthermore, measurements were taken for two different extinction ratios of the polarized light emitted (ratio between the P-polarized light and the S-polarized light), specifically 5:1 and 20:1.

TABLE 1

| Extinction ratio of polarized light | Point A | Point B | Point C |
| --- | --- | --- | --- |
| 20:1 | +2° | 0 | −2° |
| 5:1 | +1.7° | 0 | −1.7° |

The alignment direction of the alignment layer is formed according to the direction of the polarized light, i.e., according to the inclination of the polarization axis. When the polarization axis has deviations, therefore also the direction of the alignment of the alignment layer has deviations.

Sample carriers WS1 to WS 3 were placed at points A, B and C as shown in FIG. 2, thereupon specimens S1 to S3 of an alignment layer measuring 10 mm×10 mm were arranged and they were irradiated with polarized light without moving their positions. For the alignment layer, if the direction corresponding to the deviations of the polarization axis shown above, i.e., the alignment direction at point B, is taken as the reference, at point A in the direction which deviates roughly +2° from this reference and a point C in the direction which deviates roughly −2° from this reference one alignment at a time was formed.

The alignment layer which was used in this test was an alignment layer which is called an "optical compensation film" which compensates for the angle of view field, the color, the brightness and the like.

Here, it is also possible that the polarization axis of the light irradiation area has deviations which are symmetrical around point B as the axis to the left and right in the drawings (the direction to point A and the direction to point C). Therefore, optical alignment is done by moving the alignment layer along the rail R shown in FIG. 2 for scanning in the above described irradiation area from the point C which is on the right in the drawings to point B and to point A, i.e. in the direction in which the deviations of the polarization axis have been cancelled. Here, as in the above described case, two extinction ratios of the emitted polarized light, specifically 5:1 and 20:1, were used and also the speed of movement of the alignment layer was suitably set in such a way that a constant speed was reached between 1.5 m/min to 3 m/min,.

As was described above, upon irradiation with polarized light in the alignment direction of the alignment layer, hardly any deviation occurred. The direction of alignment had a value of roughly 0°, as in irradiation at point B without motion.

In this way, it is possible that the alignment layer can be aligned by movement in the direction in which deviations of the polarization axis are cancelled, in the desired direction, even if irradiation with polarized light is performed with the existing deviations of the polarization axis. This means that the direction of alignment of the alignment layer can be aligned in this way in the direction of the middle of the deviations of the polarization axis of the polarized light which is to be emitted, that the alignment layer is moved in the direction in which the deviations of the polarization axis are cancelled, until the amount of polarized light which is emitted onto the alignment layer reaches the amount of irradiation which is necessary for optical alignment of the alignment layer.

In this test, the uniformity of the illuminance of the light irradiation area which was irradiated with polarized light was roughly ±10%. The illuminance at points A, B, and C basically agrees with one another. The speed of motion of the alignment layer is constant. This means that the amounts of exposure agree with one another at the points A and C.

In the above described test, the alignment layer was moved with respect to the polarized light. However, it is also possible for the same result to be obtained by moving the polarized light which is to be emitted.

Figure 4:
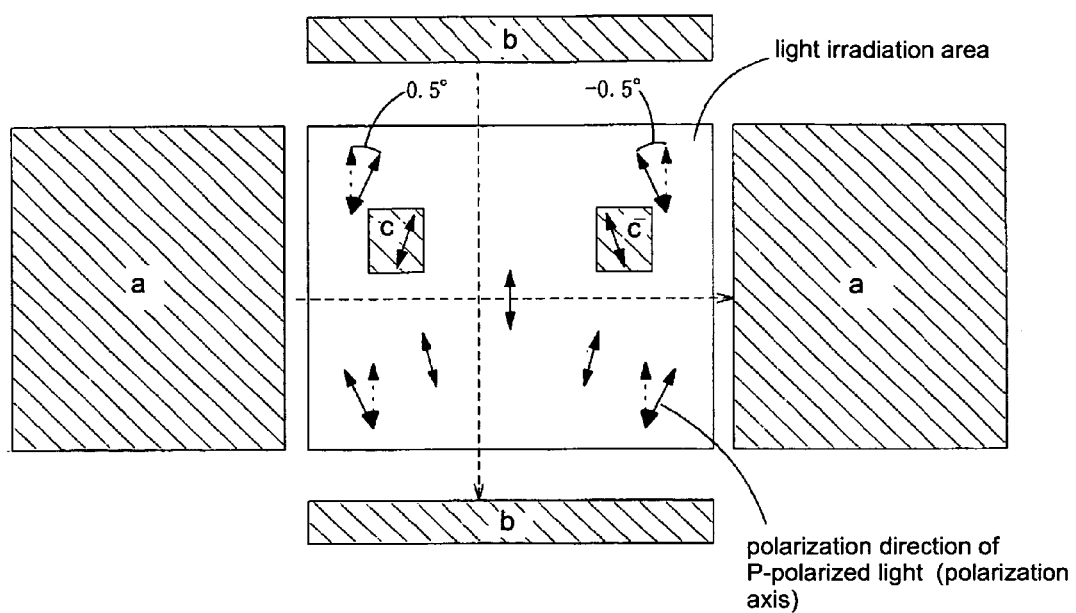
FIG. 4 is a schematic representation of another process of movement in which the alignment layers can be aligned in the desired direction.

FIG. 4 shows another process of movement in which the same effect can be expected. Here, a light irradiation area with deviations of the polarization axis that are symmetrical, as in FIG. 5, is assumed.

(i) As shown in FIG. 4, c is a substrate to which an optical alignment layer has been applied and which is smaller than the light irradiation area, and can be moved by the amount for which deviations of the polarization axis in the light irradiation area are cancelled.

(ii) As is shown in FIG. 4, a is a substrate to which an optical alignment layer has been applied and which is essentially the same size as the light irradiation area and can be moved in such a manner that the overall substrate runs beyond the light irradiation area.

(iii) Movement can also take place in the direction shown in FIG. 4 for the substrate b when the deviations of the polarization axis are cancelled.

The process of movement can also be a process for scanning at a constant speed and a process for sporadic transport. However, to cancel the deviations of the polarization axis, it is necessary to bring the amounts of exposure at the points of cancellation into agreement with one another. At the same illuminance of the polarized light at the respective point, therefore the scanning speed or the holding time during sporadic transport must always remain constant.

A case of using a point light source lamp was described above. However, as was described above, a rod-shaped lamp can also be used which is more easily used for a large area. By using a rod-shaped lamp and by moving the alignment layer in a direction in which the deviations of the polarization axis are cancelled, the deviations of the polarization axis can be eliminated in the same manner as in the case described above.

I claim:

1. Process for optical alignment in which an alignment layer is irradiated with polarized light from a light source and optical alignment is carried out, comprising the steps of:
    emitting polarized light onto an alignment layer within an light irradiation area of the light source with differently aligned polarization axes,
    moving the alignment layer and the light irradiation area relative to one another so that the dispersion of the polarization axes of the polarized light is essentially cancelled relative to one another and the direction of optical alignment in the alignment layer is made uniform.

2. Process for optical alignment as claimed in claim 1, wherein the polarization axes run mirror-symmetrically to one another with respect to a middle area of the light irradiation area and the alignment layer and light irradiation area are moved relative to one another in a direction which is essentially perpendicular to an axis of mirror symmetry.

3. Process for optical alignment as claimed in claim 2, wherein the light irradiation area and the alignment layer are moved relative to one another at an essentially constant speed.

4. Process for optical alignment as claimed in claim 1, wherein the light irradiation area and the alignment layer are moved relative to one another at an essentially constant speed.

5. Process for optical alignment as claimed in claim 1, further comprising the step of determining dispersions of the polarization axes by measuring the angle of the polarization axes prior to said emitting and moving steps.

* * * * *